(12) United States Patent
Ouali et al.

(10) Patent No.: US 8,426,353 B2
(45) Date of Patent: Apr. 23, 2013

(54) PROCESS FOR PREPARING POLYUREA MICROCAPSULES

(75) Inventors: Lahoussine Ouali, Vetraz-Monthoux (FR); Arnaud Struillou, Archamps (FR); Estelle Rassat, Valleiry (FR); Marlène Jacquemond, Viuz-en-Sallaz (FR); Otto Gräther, Satigny (CH); Claudie Bellouard Drevet, La Roche sur Foron (FR)

(73) Assignee: Firmenich SA, Geneva (CH)

( * ) Notice: Subject to any disclaimer, the term of this patent is extended or adjusted under 35 U.S.C. 154(b) by 133 days.

(21) Appl. No.: 12/993,190

(22) PCT Filed: Jun. 8, 2009

(86) PCT No.: PCT/IB2009/052414
§ 371 (c)(1),
(2), (4) Date: Nov. 17, 2010

(87) PCT Pub. No.: WO2009/153695
PCT Pub. Date: Dec. 23, 2009

(65) Prior Publication Data
US 2011/0077188 A1    Mar. 31, 2011

(30) Foreign Application Priority Data
Jun. 16, 2008   (WO) .................. PCT/IB2008/052368

(51) Int. Cl.
*A61K 8/11*      (2006.01)
(52) U.S. Cl.
USPC ............................................................ 512/2
(58) Field of Classification Search ........................ 512/2
See application file for complete search history.

(56) References Cited

U.S. PATENT DOCUMENTS

| | | | |
|---|---|---|---|
| 5,225,118 A | 7/1993 | Juang et al. ................... | 264/4.7 |
| 2002/0009495 A1 | 1/2002 | Traubel et al. ................. | 424/490 |
| 2006/0216509 A1 | 9/2006 | Kleban et al. ................. | 428/402 |
| 2007/0202063 A1 | 8/2007 | Dihora et al. ................. | 424/70.1 |
| 2008/0118568 A1 | 5/2008 | Smets et al. ................... | 424/489 |

FOREIGN PATENT DOCUMENTS

| | | |
|---|---|---|
| EP | 1 151 789 A1 | 11/2001 |
| EP | 1 588 760 A1 | 10/2005 |
| EP | 1 719 554 A2 | 11/2006 |
| EP | 1 741 775 B1 | 1/2007 |
| GB | 2 432 843 A | 6/2007 |
| GB | 2 432 850 A | 6/2007 |
| GB | 2 432 851 A | 6/2007 |
| GB | 2 432 852 A | 6/2007 |
| WO | WO 01/41915 A1 | 6/2001 |
| WO | WO 03/002699 A1 | 1/2003 |
| WO | WO 2005/054422 A1 | 6/2005 |
| WO | WO 2007/004166 A1 | 1/2007 |
| WO | WO 2007/062733 A1 | 6/2007 |
| WO | WO 2007/062833 A1 | 6/2007 |
| WO | WO 2008/005693 A2 | 1/2008 |
| WO | WO 2008/016684 A1 | 2/2008 |

OTHER PUBLICATIONS

English Translation of WO 0141915, Jun. 14 2001, by Habar.*
Luviquat Polymer Technical Information by BASF, Apr. 2011, p. 2 http://www.basf.cl/carechemicals/cosmetica/fichastecnicas/agentesacondicionadores/luviquat_polymer.pdf.*
International Search Report and Written Opinion of the International Searching Authority, Application No. PCT/IB2009/052414, Aug. 18, 2009.

* cited by examiner

*Primary Examiner* — Ling Choi
*Assistant Examiner* — Lanee Reuther
(74) *Attorney, Agent, or Firm* — Winston & Strawn LLP

(57) ABSTRACT

The present invention relates to a process for producing perfume-containing microcapsules with a polyurea wall that can be used in home or personal care products, as well as to the microcapsules themselves and consumer products that include or incorporate these microcapsules. The process of the invention uses a particular colloidal stabilizer in the form of an aqueous solution that includes defined proportions of particular polymers.

11 Claims, No Drawings

PROCESS FOR PREPARING POLYUREA MICROCAPSULES

This application is a 371 filing of International Patent Application PCT/IB2009/052414 filed Jun. 8, 2009.

TECHNICAL FIELD

The present invention relates to a process for producing perfume-containing microcapsules with a polyurea wall that can be used in home or personal care products, as well as to the microcapsules themselves and consumer products comprising these microcapsules.

The process of the invention uses a particular colloidal stabilizer in the form of an aqueous solution comprising defined proportions of particular polymers.

BACKGROUND OF THE INVENTION AND PROBLEM TO BE SOLVED

One of the problems faced by the perfumery industry lies in the relatively rapid loss of the olfactive benefit provided by odoriferous compounds due to their volatility, particularly that of "top-notes". This problem is generally tackled using a delivery system, e.g. capsules containing a perfume, to release the fragrance in a controlled manner.

Polyurea capsules, formed by polymerisation between a polyisocanate and a polyamine, are well known in the art. However, such delivery systems may suffer from stability problems, in particular when incorporated into surfactant based products such as detergents, which are strongly aggressive towards said delivery systems.

It is especially difficult to have a good stability and a good dispersion of the capsules altogether. The efficiency of the capsules, as well as their perfume retention ability, are in particular dependent on the stability of the capsules in the product base. On the other hand, their dispersion is very important because the aggregation of capsules increases the tendency of the capsule-containing product to phase separate, which is an important disadvantage.

Another important problem faced by the perfumery industry is to provide delivery systems that are well deposited on the substrate for the treatment of which they are intended to be used, such as textile, skin, hair or other surfaces. To address this problem, the use of cationic capsules has been proposed in the prior art. Cationic capsules are also known to be better dispersed in several applications.

For example, WO 01/41915 discloses a process for the preparation of capsules carrying cationic charges. Such a process is allegedly applicable to a large variety of microcapsules, in particular polyurethane-polyurea microcapsules are mentioned. After their formation, the capsules are placed in a medium which is favourable for the treatment with cationic polymers. The treatment with cationic polymers is carried out after purification of the basic capsule slurry, in order to eliminate anionic or neutral polymers which were not incorporated in the capsule wall during formation thereof, and other free electrically charged compounds involved in the encapsulation process. In particular, the capsules are diluted, isolated and then resuspended in water, or even washed to further eliminate anionic compounds. After the purification step, the capsules are agitated vigorously and the cationic polymers are added. Partially quaternized copolymers of polyvinylpyrrolidones are cited to this purpose, among many other suitable polymers. The described process comprises several steps following the capsule formation, said process being therefore time consuming and not economically profitable.

US 2006/0216509 also discloses a process for the cationization of polyurea capsules. This process involves the addition, during the wall formation, of polyamines, the capsules thus bearing latent charges, depending on the pH of the medium. Once formed, the capsules are subsequently cationized by acid action or alkylation to bear permanent positive charges. The cationic compounds therefore react with the capsule wall, chemically changing the latter.

Several other prior art documents disclose polyurea microcapsules, but these are not cationic. For example, U.S. Pat. No. 5,225,118 discloses polyurea microcapsules comprising a colloidal stabilizer in the form of an aqueous solution of polyvinyl alcohol and polyvinyl pyrrolidone but this stabilizer is not cationic and thus the microcapsules do not bear any positive charge. The microcapsules of the invention show a better deposition on the surface on which they are applied and further show a better dispersion in product bases.

Another example is WO 2007/004166 which describes polyurea microcapsules comprising polyvinyl alcohol and an anionic surfactant. Again, these microcapsules are not cationic. To the contrary, they are anionic and therefore have different properties when compared to the microcapsules of the invention. In particular, the microcapsules of the invention have the surprising and advantageous effect of being better dispersed in product bases, especially in unstructured liquid detergents.

The present invention provides a new simplified process for the preparation of polyurea microcapsules. It advantageously solves the problem of providing a single-step process for preparing polyurea microcapsules bearing permanent positive charges, the capsules being stable, well dispersed in product bases and well deposited on the substrate on which the perfumed product is applied. As a single-step process, we mean a process that does not involve any further step, after the capsule formation, unlike what is the case in the prior art.

None of the above-cited prior art documents teaches the use of a specific stabilizer in the process of the present invention, as described below, and in particular not the specific proportions of the polymers forming said stabilizer.

SUMMARY OF THE INVENTION

The present invention relates to a process for preparing cationic polyurea microcapsules encapsulating a perfume. The invention concerns the capsules themselves as well as perfuming compositions and perfumed articles containing them.

DETAILED DESCRIPTION OF THE INVENTION

One object of the present invention is a process for the preparation of polyurea microcapsules comprising
a) dissolving at least one polyisocyanate having at least two isocyanate groups in a perfume;
b) adding to the mixture obtained in step a) a colloidal stabilizer in the form of an aqueous solution of
   a. from 0.1% to 0.4% of a polyvinyl alcohol and
   b. from 0.6% to 1% of a cationic copolymer of vinylpyrrolidone and of a quaternized vinylimidazol
   the percentages being defined by weight, relative to the total weight of the colloidal stabilizer;
c) adding to the mixture obtained in step b) a reactant selected from the group consisting of water soluble guanidine salts and guanidine to form a polyurea wall with the polyisocyanate.

The perfume in which the polyisocyanate is dissolved in step a) can be a perfuming ingredient alone or a mixture of ingredients, in the form of a perfuming composition. Specific examples of such perfuming ingredients may be found in the current literature, for example in Perfume and Flavour Chemicals, 1969 (and later editions), by S. Arctander, Montclair N.J. (USA), as well as in the vast patent and other literature related to the perfume industry. They are well known to the skilled person in the art of perfuming consumer products, that is, of imparting a pleasant odour to a consumer product.

The perfuming ingredients may be dissolved in a solvent of current use in the perfume industry. The solvent is preferably not an alcohol. Examples of such solvents are diethyl phthalate, isopropyl myristate, Abalyn®, benzyl benzoate, ethyl citrate, limonene or other terpenes, or isoparaffins. Preferably, the solvent is very hydrophobic and highly sterically hindered, like for example Abalyn®. Preferably the perfume comprises less than 30% of solvent. More preferably the perfume comprises less than 20% and even more preferably less than 10% of solvent, all these percentages being defined by weight relative to the total weight of the perfume. Most preferably, the perfume is essentially free of solvent.

Preferred ingredients are those having a high steric hindrance and in particular those from one of the following groups:

Group 1: perfuming ingredients comprising a cyclohexyl, cyclohexenyl, cyclohexanone or cyclohexenone ring substituted with at least one linear or branched $C_1$ to $C_4$ alkyl or alkenyl substituent;

Group 2: perfuming ingredients comprising a cyclopentyl, cyclopentenyl, cyclopentanone or cyclopentenone ring substituted with at least one linear or branched $C_4$ to $C_8$ alkyl or alkenyl substituent;

Group 3: perfuming ingredients comprising a phenyl ring or perfuming ingredients comprising a cyclohexyl, cyclohexenyl, cyclohexanone or cyclohexenone ring substituted with at least one linear or branched $C_5$ to $C_8$ alkyl or alkenyl substituent or with at least one phenyl substituent and optionally one or more linear or branched $C_1$ to $C_3$ alkyl or alkenyl substituents;

Group 4: perfuming ingredients comprising at least two fused or linked $C_5$ and/or $C_6$ rings;

Group 5: perfuming ingredients comprising a camphor-like ring structure;

Group 6: perfuming ingredients comprising at least one $C_7$ to $C_{20}$ ring structure;

Group 7: perfuming ingredients having a logP value above 3.5 and comprising at least one tent-butyl or at least one trichloromethyl substitutent.

Examples of ingredients from each of these groups are:

Group 1: 2,4-dimethyl-3-cyclohexene-1-carbaldehyde (origin: Firmenich SA, Geneva, Switzerland), isocyclocitral, menthone, isomenthone, Romascone® (methyl 2,2-dimethyl-6-methylene-1-cyclohexanecarboxylate, origin: Firmenich SA, Geneva, Switzerland), nerone, terpineol, dihydroterpineol, terpenyl acetate, dihydroterpenyl acetate, dipentene, eucalyptol, hexylate, rose oxide, Perycorolle® ((S)-1,8-p-menthadiene-7-ol, origin: Firmenich SA, Geneva, Switzerland), 1-p-menthene-4-ol, (1RS,3RS,4SR)-3-p-mentanyl acetate, (1R,2S,4R)-4,6,6-trimethyl-bicyclo[3,1,1]heptan-2-ol, Doremox® (tetrahydro-4-methyl-2-phenyl-2H-pyran, origin: Firmenich SA, Geneva, Switzerland), cyclohexyl acetate, cyclanol acetate, Fructalate (1,4-cyclohexane diethyldicarboxylate, origin: Firmenich SA, Geneva, Switzerland), Koumalactone® ((3ARS,6SR,7ASR)-perhydro-3,6-dimethyl-benzo[B]furan-2-one, origin: Firmenich SA, Geneva, Switzerland), Natactone ((6R)-perhydro-3,6-dimethyl-benzo[B]furan-2-one, origin: Firmenich SA, Geneva, Switzerland), 2,4,6-trimethyl-4-phenyl-1,3-dioxane, 2,4,6-trimethyl-3-cyclohexene-1-carbaldehyde;

Group 2: (E)-3-methyl-5-(2,2,3-trimethyl-3-cyclopenten-1-yl)-4-penten-2-ol (origin: Givaudan SA, Vernier, Switzerland), (1'R,E)-2-ethyl-4-(2',2',3'-trimethyl-3'-cyclopenten-1'-yl)-2-buten-1-ol (origin: Firmenich SA, Geneva, Switzerland), Polysantol® ((1'R,E)-3,3-dimethyl-5-(2',2',3'-trimethyl-3'-cyclopenten-1'-yl)-4-penten-2-ol, origin: Firmenich SA, Geneva, Switzerland), fleuramone, Paradisone® (methyl-(1R)-cis-3-oxo-2-pentyl-1-cyclopentane acetate, origin: Firmenich SA, Geneva, Switzerland), Veloutone (2,2,5-Trimethyl-5-pentyl-1-cyclopentanone, origin: Firmenich SA, Geneva, Switzerland), Nirvanol® (3,3-dimethyl-5-(2,2,3-trimethyl-3-cyclopenten-1-yl)-4-penten-2-ol, origin: Firmenich SA, Geneva, Switzerland), 3-methyl-5-(2,2,3-trimethyl-3-cyclopenten-1-yl)-2-pentanol (origin, Givaudan SA, Vernier, Switzerland);

Group 3: damascones, Neobutenone® (1-(5,5-dimethyl-1-cyclohexen-1-yl)-4-penten-1-one, origin: Firmenich SA, Geneva, Switzerland), nectalactone ((1'R)-2-[2-(4'-methyl-3'-cyclohexen-1'-yl)propyl]cyclopentanone), alpha-ionone, beta-ionone, damascenone, Dynascone® (mixture of 1-(5,5-dimethyl-1-cyclohexen-1-yl)-4-penten-1-one and 1-(3,3-dimethyl-1-cyclohexen-1-yl)-4-penten-1-one, origin: Firmenich SA, Geneva, Switzerland), Dorinone® beta (1-(2,6,6-trimethyl-1-cyclohexen-1-yl)-2-buten-1-one, origin: Firmenich SA, Geneva, Switzerland), Romandolide® ((1S,1'R)-[1-(3',3'-Dimethyl-1'-cyclohexyl)ethoxycarbonyl]methyl propanoate, origin: Firmenich SA, Geneva, Switzerland), 2-tert-butyl-1-cyclohexyl acetate (origin: International Flavors and Fragrances, USA), Limbanol® (1-(2,2,3,6-tetramethyl-cyclohexyl)-3-hexanol, origin: Firmenich SA, Geneva, Switzerland), trans-1-(2,2,6-trimethyl-1-cyclohexyl)-3-hexanol (origin: Firmenich SA, Geneva, Switzerland), (E)-3-methyl-4-(2,6,6-trimethyl-2-cyclohexen-1-yl)-3-buten-2-one, terpenyl isobutyrate, Lorysia® (4-(1,1-dimethylethyl)-1-cyclohexyl acetate, origin: Firmenich SA, Geneva, Switzerland), 8-methoxy-1-p-menthene, Helvetolide® ((1S,1'R)-2-[1-(3',3'-dimethyl-1'-cyclohexyl)ethoxy]-2-methylpropyl propanoate, origin: Firmenich SA, Geneva, Switzerland), para tert-butylcyclohexanone, menthenethiol, 1-methyl-4-(4-methyl-3-pentenyl)-3-cyclohexene-1-carbaldehyde, allyl cyclohexylpropionate, cyclohexyl salicylate;

Group 4: Methyl cedryl ketone (origin: International Flavors and Fragrances, USA), Verdylate, vetyverol, vetyverone, 1-(octahydro-2,3,8,8-tetramethyl-2-naphtalenyl)-1-ethanone (origin: International Flavors and Fragrances, USA), (5RS,9RS,10SR)-2,6,9,10-tetramethyl-1-oxaspiro[4.5]deca-3,6-diene and the (5RS,9SR,10RS) isomer, 6-ethyl-2,10,10-trimethyl-1-oxaspiro[4.5]deca-3,6-diene, 1,2,3,5,6,7-hexahydro-1,1,2,3,3-pentamethyl-4-indenone (origin: International Flavors and Fragrances, USA), Hivernal® (a mixture of 3-(3,3-dimethyl-5-indanyl)propanal and 3-(1,1-dimethyl-5-indanyl)propanal, origin: Firmenich SA, Geneva, Switzerland), Rhubofix® (3',4-dimethyl-tricyclo[6.2.1.0(2,7)]undec-4-ene-9-spiro-2'-oxirane, origin: Firmenich SA, Geneva, Switzerland), 9/10-ethyldiene-3-oxatricyclo[6.2.1.0(2,7)]undecane, Polywood® (perhydro-5,5,8A-trimethyl-2-naphthalenyl acetate, origin: Firmenich SA, Geneva, Switzerland), octalynol, Cetalox® (dodecahydro-3a,6,6,9a-tetramethyl-naphtho[2,1-b]furan, origin: Firmenich SA, Geneva, Switzerland), tricyclo[5.2.1.0 (2,6)]dec-3-en-8-yl acetate and tricyclo[5.2.1.0(2,6)] dec-4-en-8-yl acetate as well as tricyclo[5.2.1.0(2,6)] dec-3-en-8-yl propanoate and tricyclo[5.2.1.0(2,6)]dec-4-en-8-yl propanoate;

Group 5: camphor, borneol, isobornyl acetate, 8-isopropyl-6-methyl-bicyclo[2.2.2]oct-5-ene-2-carbaldehyde, camphopinene, cedramber (8-methoxy-2,6,6,8-tetramethyl-tricyclo[5.3.1.0(1,5)]undecane, origin: Firmenich SA, Geneva, Switzerland), cedrene, cedrenol, cedrol, Florex® (mixture of 9-ethylidene-3-oxatricyclo[6.2.1.0 (2,7)]undecan-4-one and 10-ethylidene-3-oxatricyclo [6.2.1.0(2,7)]undecan-4-one, origin: Firmenich SA, Geneva, Switzerland), 3-methoxy-7,7-dimethyl-10-methylene-bicyclo[4.3.1]decane (origin: Firmenich SA, Geneva, Switzerland);

Group 6: Cedroxyde® (trimethyl-13-oxabicyclo-[10.1.0]-trideca-4,8-diene, origin: Firmenich SA, Geneva, Switzerland), Ambrettolide LG ((E)-9-hexadecen-16-olide, origin: Firmenich SA, Geneva, Switzerland), Habanolide® (pentadecenolide, origin: Firmenich SA, Geneva, Switzerland), muscenone (3-methyl-(4/5)-cyclopentadecenone, origin: Firmenich SA, Geneva, Switzerland), muscone (origin: Firmenich SA, Geneva, Switzerland), Exaltolide® (pentadecanolide, origin: Firmenich SA, Geneva, Switzerland), Exaltone® (cyclopentadecanone, origin: Firmenich SA, Geneva, Switzerland), (1-ethoxyethoxy)cyclododecane (origin: Firmenich SA, Geneva, Switzerland), Astrotone;

Group 7: Lilial® (origin: Givaudan SA, Vernier, Switzerland), rosinol.

Preferably, the perfume in which the polyisocyanate is dissolved comprises at least 30%, preferably at least 50%, more preferably at least 60% of ingredients selected from Groups 1 to 7, as defined above. More preferably said perfuming composition comprises at least 30%, preferably at least 50% of ingredients from Groups 3 to 7, as defined above. Most preferably said composition comprises at least 30%, preferably at least 50% of ingredients from Groups 3, 4, 6 or 7, as defined above.

According to another preferred embodiment, the perfume comprises at least 30%, preferably at least 50%, more preferably at least 60% of ingredients having a logP above 3, preferably above 3.5 and even more preferably above 3.75.

According to a further embodiment of the invention, the perfume used in the process of the invention contains less than 5% of its own weight of primary alcohols, less than 10% of its own weight of secondary alcohols and less than 15% of its own weight of tertiary alcohols. Preferably, the perfume used in the process of the invention does not contain any primary alcohols and contains less than 10% of secondary and tertiary alcohols.

According to another preferred embodiment of the invention, there is used an amount of between 28 and 60% of perfume in the process of the invention, these percentages being defined by weight relative to the total weight of the microcapsules.

The polyisocyanate used in the process of the invention comprises at least two isocyanate groups. Preferably it contains at least three isocyanate groups. Following these numbers of functional groups, an optimal reticulation or network of the capsules wall is achieved, providing thus microcapsules exhibiting a surprising prolonged slow release of fragrances, as well as a surprising improved stability in the consumer product.

Low volatility polyisocyanate molecules are preferred because of their low toxicity. In particular, the polyisocyanate is preferably selected from the group consisting of a trimer of hexamethylene diisocyanate, a trimer of isophorone diisocyanate or a Biuret of hexamethylene diisocyanate, among which a Biuret of hexamethylene diisocyanate is even more preferred.

Preferably the polyisocyanate is added in an amount comprised between 2 and 20% by weight, relative to the total weight of the solution.

The colloidal stabilizer added in step b) comprises polyvinyl alcohol as stabilizer and a cationic copolymer of vinylpyrrolidone and of a quaternized vinylimidazol, which is very efficient in dispersing the capsules in surfactant-based consumer products.

According to a preferred embodiment, the colloidal stabilizer is in the form of an aqueous solution of
a. from 0.15% to 0.25% of a polyvinyl alcohol and
b. from 0.75% to 1% of a cationic copolymer of vinylpyrrolidone and of a quaternized vinylimidazol
the percentages being defined by weight, relative to the total weight of the colloidal stabilizer.

These polymers must be added in the concentrations defined above in order to obtain a stable emulsion, which does not phase separate. In particular, using higher concentrations of polyvinyl alcohol induces a phase separation when the capsules are added to a surfactant-based consumer product. The colloidal stabilizer is easily prepared by dissolving both polymers in water.

According to a preferred embodiment the cationic copolymer of vinylpyrrolidone and of a quaternized vinylimidazol is one of those sold under the trade name Luviquat®, in particular Luviquat® Ultra Care or Luviquat® FC 550 (origin BASF), these product being defined as copolymers of vinylpyrrolidone (VP) and quaternized vinylimidazol (QVI) with a range of charge densities, in aqueous solution.

In step c) of the process of the invention, a reactant selected from the group of water soluble guanidine salts and guanidine is added. By "water soluble guanidine salt" it is meant a salt soluble in water and resulting from the reaction of guanidine with an acid. One example of such salts is guanidine carbonate. The polyurea wall of the microcapsules is the result of the interfacial polymerisation between the polyisocyanate dissolved in step a) and the reactant added in step c).

Preferably, for each mole of isocyanate group dissolved in the perfume in step a), 1 to 3, preferably 1.2 to 2 moles of guanidine or guanidine salt are added in step c). Accordingly there is added an excess of said reactant.

No specific action is required to induce the polymerisation between the polyisocyanates and the guanidine or guanidine salt in the dispersion. The reaction starts immediately after adding said reactant. Preferably the reaction is maintained for 2 to 15 hours, more preferably for 4 to 10 hours.

The specific composition of the polyurea wall is key in obtaining microcapsules that are at the fine balance between release and retention so as to achieve satisfactory slow and constant release of fragrances over time, once the capsules are placed on textiles or hair, while showing the desired stability in the product base (e.g. counteracts efficiently the extraction of the perfume by the surfactants of the consumer product). Therefore the selection of the guanidine or guanidine salt and of the polyisocyanate, among the ones mentioned above, enables the fine tuning of the properties and stability of the capsules.

The dispersion may be prepared by high shear mixing and adjusted to the desired droplet size. Droplet size may be checked with light scattering measurements or microscopy.

For the purpose of the present invention, a dispersion is characterized by the stabilization of the oil droplets by a colloidal stabilizer, in contrast to an emulsion, wherein the oil droplets are stabilized by emulsifiers.

The microcapsules obtained by the process of any of the above-described embodiments are also one object of the present invention. Therefore, microcapsules comprising
- a polyurea wall, which is the reaction product of the polymerisation between at least one polyisocyanate comprising at least two isocyanate functional groups and at least one reactant selected from the group consisting of a water soluble guanidine salt and guanidine;
- a colloidal stabilizer; and
- an encapsulated perfume;

characterised in that the colloidal stabilizer consists of an aqueous solution of
- between 0.1% and 0.4% of polyvinyl alcohol
- between 0.6% and 1% of a cationic copolymer of vinylpyrrolidone and of a quaternized vinylimidazol;
- all percentages being defined by weight relative to the total weight of the colloidal stabilizer.

The microcapsules obtained have a mean diameter comprised between 1 and 50 μm and preferably comprised between 5 and 20 μm. In the present context, "mean diameter" refers to the arithmetic mean. The present inventors found that with microcapsules of this size, optimal deposition and/or adherence of microcapsules to the targeted surface, e.g. textile, hair or skin, is obtained.

The microcapsules are also preferably characterised by a Zeta potential comprised between 20 and 60 mV, preferably between 25 and 45 mV.

The polyurea wall composition, the polyisocyanate, the perfume, the colloidal stabilizer and the guanidine or the water-soluble guanidine salt are as defined above, in relation to the process of preparation of the microcapsules.

The microcapsules of the invention can be advantageously used for the controlled release of the encapsulated perfume. It is therefore particularly appreciated to include these microcapsules as perfuming ingredients in a perfumed consumer product. This result is highly surprising since said consumer products may contain high amounts (typically more than 10% of their own weight) of specific types of surfactant/tensioactive/solvents and which are known to significantly diminish the stability and the performance of said capsules. In other words, the use of the invention's microcapsules in the consumer products provides unexpected advantages over the same use of other similar prior art capsules.

As shown in the examples below, the cationic polyurea microcapsules obtained by the process of the invention provide improved deposition of the perfume on the treated surface together with an improved stability in a chemically aggressive environment and thus a good retention of the perfume, especially in detergents and fabric softeners. The cationic polyurea microcapsules are also well dispersed in the consumer product bases, so that no phase separation is induced upon addition of the capsules to the base and during a sufficient storage period. The microcapsules of the invention provide a controlled release of the encapsulated perfume, said perfume being slowly released from the microcapsules, thus considerably improving the perfume long-lastingness and intensity.

A perfumed consumer product comprising the microcapsules of the invention are therefore also objects of the present invention. In particular the consumer product may be in the form of a home- or personal-care product. Preferably, it is in the form of a liquid shampoo, hair conditioner, shower gel, detergent, all-purpose cleaner or fabric softener or in the form of a powder or tablet detergent. More preferably the consumer product is in the form of a liquid, powder or tablet detergent, or in the form of a fabric softener. As detergents we include here products such as detergent compositions or cleaning products for washing up or for cleaning various surfaces, for example intended for the treatment of textiles, dishes or hard surfaces (floors, tiles, stone-floors, etc). Preferably the surface is a textile.

The reaction mixture obtained in the process of the invention may be used as such to perfume the consumer products. For example, the reaction mixture may be directly added to a liquid fabric softener at a rate of 0.1 to 30% by weight relative to the total weight of the softener. Alternatively, the microcapsules obtained in the process of the invention may be isolated from the reaction mixture before being incorporated into a consumer product. Similarly, the reaction mixture comprising the microcapsules of the invention may be sprayed onto a dry, powdered product, such as a washing powder or powdered detergent or the microcapsules may be dried and added to these products in solid form.

Preferably, the consumer product comprises from 0.01 to 4.5%, more preferably from 0.01 to 4% of the microcapsules of the present invention, these percentages being defined by weight relative to the total weight of the consumer product. Of course the above concentrations may be adapted according to the olfactive effect desired in each product.

Formulations of consumer product bases in which the microcapsules of the invention can be incorporated can be found in the abundant literature relative to such products. These formulations do not warrant a detailed description here, which would in any case not be exhaustive. The person skilled in the art of formulating such consumer products is perfectly able to select the suitable components on the basis of his general knowledge and of the available literature. In particular, examples of such formulations can be found in the patents and patent applications relative to such products, for example in WO 2008/016684 (pages 10 to 14), in US 2007/0202063 (paragraphs [0044] to [0099]), in WO 2007/062833 (pages 26 to 44), in WO 2007/062733 (pages 22 to 40), in WO 2005/054422 (pages 4 to 9), in EP 1741775, in GB 2432843, in GB 2432850, in GB 2432851 or in GB 2432852.

EXAMPLES

The following examples are further illustrative of the present invention embodiments, and further demonstrate the advantages of the invention devices relative to prior art teachings.

Example 1

Preparation of Cationic Polyurea Microcapsules

Polyurea capsules were prepared in a one litre glass double-jacketed reactor equipped with a scrapped stirrer and with an Ystral-rotor/stator system (500-1800 rpm).

In a typical experiment, 10.20 g of the polyisocyanate (Desmodur® N100, origin: Bayer), were dissolved in 291.4 g of perfume. This oil phase was introduced in the reactor and stirred with the scrapped stirrer at 50 rpm.

The aqueous stabilizer solution was prepared by dissolving the polyvinyl alcohol (Mowiol® 18-88, origin: Fluka) and the cationic copolymer Luviquat® Ultra Care (polyquaternium-44, origin: BASF) in deionised water. The final concentration of the polyvinyl alcohol was 0.25% while the concentration of Luviquat® Ultra Care was 0.75%, these percentages being relative to the total weight of the stabilizer solution.

The stabilizer solution was introduced into the reactor at room temperature in an amount of 582.50 g. The scrapped stirrer was stopped and then a pre-emulsion was prepared by dispersing the perfume phase in the aqueous phase with the rotor/stator system. During this step, the temperature was maintained at 10° C. The time and the speed of stirring were adjusted to reach the desired size distribution of the emulsion. Once the emulsion was prepared, the stirring was continued with the scrapped stirrer at 200 rpm till the end of the process.

There were added to the emulsion 2.00 g of an aqueous solution of tetraethyl ammonium chloride 10% (origin: Fluka).

Then, 4.00 g of guanidine carbonate (origin: Fluka) dissolved in 112.20 g of deionised water were added in the reactor in 6 times (every 10 minutes). The temperature of the reaction mixture was then slowly increased from 10° C. to 70° C. (during 1 hour). The temperature was kept at 70° C. for two hours. The stirring speed was then decreased to 100 rpm and the capsules suspension was cooled down at room temperature.

The perfume content in the capsules suspension was around 28%, relative to the total weight of the suspension. The size distribution of the capsules was controlled by Optical Microscopy and Light Scattering (Mastersizer S, Malvern) while the surface charge was controlled by Zeta potential measurements (Nanosizer, Malvern).

The synthesis was repeated several times and the value of the Zeta potential measured for the obtained capsules were comprised between +8 and +20 mV, thus indicating that the capsules were cationically charged.

Example 2

Preparation of Cationic Polyurea Microcapsules

Polyurea capsules were prepared in a one litre glass double-jacketed reactor equipped with a scrapped stirrer and with an Ystral-rotor/stator system (500-1800 rpm).

In a typical experiment, 22.40 g of the polyisocyanate (Desmodur® N100, origin: Bayer), were dissolved in 400 g of perfume. This oil phase was introduced in the reactor and stirred with the scrapped stirrer at 50 rpm.

The aqueous stabilizer solution was prepared by dissolving the polyvinyl alcohol (Mowiol® 18-88, origin: Fluka) and the cationic copolymer Luviquat® Ultra Care (polyquaternium-44, origin: BASF) in deionised water. The final concentration of the polyvinyl alcohol was 0.25% while the concentration of Luviquat® Ultra Care was 0.75%, these percentages being relative to the total weight of the stabilizer solution.

The stabilizer solution was introduced in an amount of 570.70 g into the reactor at room temperature. The scrapped stirrer was stopped and then a pre-emulsion was prepared by dispersing the perfume phase in the aqueous phase with the rotor/stator system. During this step, the temperature was maintained at 10° C. The time and the speed of stirring were adjusted to reach the desired size distribution of the emulsion. Once the emulsion was prepared, the stirring was continued with the scrapped stirrer at 200 rpm till the end of the process.

There were added to the emulsion 4.00 g of an aqueous solution of tetraethyl ammonium chloride 50% (origin: Fluka).

Then, 5.30 g of guanidine carbonate (origin: Fluka) were added to the reactor in 6 times (every 10 minutes). The temperature of the reaction mixture was then slowly increased from 10° C. to 70° C. (during 1 hour). The temperature was kept at 70° C. for two hours. The stirring speed was then decreased to 100 rpm and the capsules suspension was cooled down at room temperature.

The perfume content in the capsules suspension was around 40%, relative to the total weight of the suspension. The size distribution of the capsules was controlled by Optical Microscopy and Light Scattering (Mastersizer S, Malvern) while the surface charge was controlled by Zeta potential measurements (Nanosizer, Malvern).

The synthesis was repeated several times and the value of the Zeta potential measured for the obtained capsules were comprised between +8 and +20 mV, thus indicating that the capsules were cationically charged.

Example 3

Preparation of Cationic Polyurea Microcapsules

Polyurea capsules were prepared in a one litre glass double-jacketed reactor equipped with a scrapped stirrer and with an Ystral-rotor/stator system (500-1800 rpm).

In a typical experiment, 10.20 g of the polyisocyanate (Desmodur® N100, origin: Bayer), were dissolved in 291.4 g of perfume. This oil phase was introduced in the reactor and stirred with the scrapped stirrer at 50 rpm.

The aqueous stabilizer solution was prepared by dissolving the polyvinyl alcohol (Mowiol® 18-88, origin: Fluka) and the cationic copolymer Luviquat® Ultra Care (polyquaternium-44, origin: BASF) in deionised water. The final concentration of the polyvinyl alcohol was 0.25% while the concentration of Luviquat® Ultra Care was 1%, these percentages being relative to the total weight of the stabilizer solution.

The stabilizer solution was introduced into the reactor at room temperature in an amount of 582.50 g. The scrapped stirrer was stopped and then a pre-emulsion was prepared by dispersing the perfume phase in the aqueous phase with the rotor/stator system. During this step, the temperature was maintained at 10° C. The time and the speed of stirring were adjusted to reach the desired size distribution of the emulsion. Once the emulsion was prepared, the stirring was continued with the scrapped stirrer at 200 rpm till the end of the process.

There were added to the emulsion 2.00 g of an aqueous solution of tetraethyl ammonium chloride 10% (origin: Fluka).

Then, 4.00 g of guanidine carbonate (origin: Fluka) dissolved in 112.20 g of deionised water were added in the reactor in 6 times (every 10 minutes). The temperature of the reaction mixture was then slowly increased from 10° C. to 70° C. (during 1 hour). The temperature was kept at 70° C. for two hours. The stirring speed was then decreased to 100 rpm and the capsules suspension was cooled down at room temperature.

The perfume content in the capsules suspension was around 28%, relative to the total weight of the suspension. The size distribution of the capsules was controlled by Optical Microscopy and Light Scattering (Mastersizer S, Malvern) while the surface charge was controlled by Zeta potential measurements (Nanosizer, Malvern). A positive value of the Zeta potential indicated that the capsules were cationically charged.

Example 4

Preparation of Cationic Polyurea Microcapsules

Polyurea capsules were prepared in a one litre glass double-jacketed reactor equipped with a scrapped stirrer and with an Ystral-rotor/stator system (500-1800 rpm).

In a typical experiment, 22.40 g of the polyisocyanate (Desmodur® N100, origin: Bayer), were dissolved in 400 g of perfume. This oil phase was introduced in the reactor and stirred with the scrapped stirrer at 50 rpm.

The aqueous stabilizer solution was prepared by dissolving the polyvinyl alcohol (Mowiol® 18-88, origin: Fluka) and the cationic copolymer Luviquat® Ultra Care (polyquaternium-44, origin: BASF) in deionised water. The final concentration of the polyvinyl alcohol was 0.25% while the concentration of Luviquat® Ultra Care was 1%, these percentages being relative to the total weight of the stabilizer solution.

The stabilizer solution was introduced in an amount of 570.70 g into the reactor at room temperature. The scrapped stirrer was stopped and then a pre-emulsion was prepared by dispersing the perfume phase in the aqueous phase with the rotor/stator system. During this step, the temperature was maintained at 10° C. The time and the speed of stirring were adjusted to reach the desired size distribution of the emulsion. Once the emulsion was prepared, the stirring was continued with the scrapped stirrer at 200 rpm till the end of the process.

There were added to the emulsion 4.00 g of an aqueous solution of tetraethyl ammonium chloride 50% (origin: Fluka).

Then, 5.30 g of guanidine carbonate (origin: Fluka) were added to the reactor in 6 times (every 10 minutes). The temperature of the reaction mixture was then slowly increased from 10° C. to 70° C. (during 1 hour). The temperature was kept at 70° C. for two hours. The stirring speed was then decreased to 100 rpm and the capsules suspension was cooled down at room temperature.

The perfume content in the capsules suspension was around 40%, relative to the total weight of the suspension. The size distribution of the capsules was controlled by Optical Microscopy and Light Scattering (Mastersizer S, Malvern) while the surface charge was controlled by Zeta potential measurements (Nanosizer, Malvern). A value of the Zeta potential of +5 mV indicated that the capsules were cationically charged.

Example 5

Preparation of Cationic Polyurea Microcapsules

Polyurea capsules were prepared in a one litre glass double-jacketed reactor equipped with a scrapped stirrer and with an Ystral-rotor/stator system (500-1800 rpm).

In a typical experiment, 23 g of the polyisocyanate (Desmodur® N100, origin: Bayer), were dissolved in 400 g of perfume. This oil phase was introduced in the reactor and stirred with the scrapped stirrer at 50 rpm.

The aqueous stabilizer solution was prepared by dissolving the polyvinyl alcohol (Mowiol® 18-88, origin: Fluka) and the cationic copolymer Luviquat® FC 550 (polyquaternium-16, origin: BASF) in deionised water. The final concentration of the polyvinyl alcohol was 0.25% while the concentration of Luviquat® FC 550 was 0.75%, these percentages being relative to the total weight of the stabilizer solution.

The stabilizer solution was introduced in an amount of 549 g into the reactor at room temperature. The scrapped stirrer was stopped and then a pre-emulsion was prepared by dispersing the perfume phase in the aqueous phase with the rotor/stator system at room temperature. The time and the speed of stirring were adjusted to reach the desired size distribution of the emulsion. Once the emulsion was prepared, the stirring was continued with the scrapped stirrer at 200 rpm till the end of the process.

There were added to the emulsion 4.00 g of an aqueous solution of tetraethyl ammonium chloride 50% (origin: Fluka).

Then, 9 g of guanidine carbonate (origin: Acros Organics) dissolved in 19 g of deionised water were added to the reactor in 6 times (every 10 minutes). The temperature of the reaction mixture was then slowly increased from room temperature to 70° C. (during 1 hour). The temperature was kept at 70° C. for two hours. The stirring speed was then decreased to 100 rpm and the capsules suspension was cooled down at room temperature.

The perfume content in the capsules suspension was around 40%, relative to the total weight of the suspension. The size distribution of the capsules was controlled by Optical Microscopy and Light Scattering (Mastersizer S, Malvern) while the surface charge was controlled by Zeta potential measurements (Nanosizer, Malvern).

The synthesis was repeated several times and the value of the Zeta potential measured for the obtained capsules were comprised between +35 and +45 mV, thus indicating that the capsules were cationically charged.

Example 6

Stability of the Microcapsules when Incorporated into a Consumer Product of the Softener Type or the Concentrated Liquid Detergent Type A perfuming composition was prepared by admixing the ingredients listed in Table 1, in the amounts indicated. The percentages are defined by weight relative to the total weight of the perfuming composition.

TABLE 1

Composition of the perfume

| Ingredients | % | LogP | Steric Hindrance Group |
|---|---|---|---|
| 1,8-Cineole | 5.00 | 3.13 | 1 |
| Verdylate | 15.00 | 3.76 | 4 |
| δ-Damascone | 3.00 | 4.13 | 3 |
| Lilial ®[1)] | 12.00 | 4.36 | 7 |
| Dihydroterpenyl acetate | 6.00 | 4.42 | 1 |
| β-Ionone | 2.00 | 4.42 | 3 |
| Lorysia ®[2)] | 6.50 | 4.42 | 3 |
| Iso E super ®[3)] | 10.00 | 4.71 | 4 |
| Cetalox ®[4)] | 2.00 | 4.76 | 4 |
| Habanolide ®[5)] | 82.00 | 4.88 | 6 |
| 1-Methyl-4-(4-methyl-3-pentenyl)-3-cyclohexene-1-carbaldehyde | 1.00 | 5.19 | 3 |
| Polysantol ®[6)] | 2.00 | 5.39 | 2 |
| Patchouli essential oil | 3.00 | 5.5 | 4 |
| Octalynol | 0.50 | 4.28 | 4 |
| Cyclohexyl salicylate | 5.30 | 4.87 | 3 |
| Isopropyl myristate | 1.00 | 7.17 | |
| Neobutenone ® alpha[7)] | 2.50 | 4.45 | 3 |
| Iralia ® total[8)] | 12.00 | 4.84 | 3 |
| Nectalactone[9)] | 3.00 | 5.05 | 3 |
| Total | 100.00 | | |

[1)]3-(4-tert-butylphenyl)-2-methylpropanal (origin: Givaudan SA, Vernier, Switzerland)
[2)]4-(1,1-dimethylethyl)-1-cyclohexyl acetate (origin: Firmenich SA, Geneva, Switzerland)
[3)]1-(octahydro-2,3,8,8-tetramethyl-2-naphtalenyl)-1-ethanone (origin: International Flavors & Fragrances, USA)
[4)]dodecahydro-3a,6,6,9a-tetramethyl-naphtho[2,1-b]furan (origin: Firmenich SA, Geneva, Switzerland)
[5)]pentadecenolide (origin: Firmenich SA, Geneva, Switzerland)
[6)](1'R,E)-3,3-dimethyl-5-(2',2',3'-trimethyl-3'-cyclopenten-1'-yl)-4-penten-2-ol (origin: Firmenich SA, Geneva, Switzerland)
[7)]1-(5,5-dimethyl-1-cyclohexen-1-yl)-4-penten-1-one (origin: Firmenich SA, Geneva, Switzerland)
[8)]Mixture of isomers of methylionones (origin: Firmenich SA, Geneva, Switzerland)
[9)](1'R)-2-[2-(4'-methyl-3'-cyclohexen-1'-yl)propyl]cyclopentanone (origin: Firmenich SA, Geneva, Switzerland)

The log P distribution of the ingredients present in the perfuming composition is summarized in Table 2 and the proportions of the perfuming composition consisting of ingredients from each of high steric hindrance Groups 1 to 7, as described above, is summarized in Table 3. The percentages are defined by weight relative to the total weight of the perfuming composition.

TABLE 2

Composition of the perfume by logP of ingredients

| LogP | % |
|---|---|
| logP > 5 | 10.00 |
| 4.5 < logP < 5 | 37.50 |
| 4 < logP < 4.5 | 32.50 |
| 3.5 < logP < 4 | 15.00 |
| 3 < logP < 3.5 | 5.00 |
| Total | 100.00 |

TABLE 3

Composition of the perfume by high steric hindrance group

| High steric hindrance group | % |
|---|---|
| Group 1 | 11.00 |
| Group 2 | 2.00 |
| Group 3 | 35.30 |
| Group 4 | 30.50 |
| Group 5 | 0.00 |
| Group 6 | 8.20 |
| Group 7 | 12.00 |
| Total concentration of ingredients in Groups 1 to 7 | 99.00 |
| Total concentration of Groups 3, 4, 6 and 7 ingredients | 86.00 |

This perfuming composition was encapsulated following the process described in Example 2 and added to either a concentrated fabric-softener or a concentrated liquid detergent.

The concentrated liquid detergent base was a commercially available Tide® 2× Concentrated HE Free of perfume & dye (trademark of Procter and Gamble, USA).

The concentrated fabric softener base was prepared by admixing the ingredients listed in Table 4, in the amounts indicated. The percentages are defined by weight relative to the total weight of the unperfumed fabric softener base.

TABLE 4

Formulation of the concentrated fabric softener base

| Ingredient | % |
|---|---|
| Stepantex VL90 A Diester Quat[10] | 16.50 |
| Proxel GXL[11] | 0.04 |
| CaCl$_2$ (10% aqueous solution) | 0.20 |
| Water | 83.26 |

[10] Origin: Stepan
[11] Origin: Avecia

Capsules were mixed at 1.25% into the unperfumed softener or liquid detergent and both products were stored for one month in ovens at either 22° C. or 37° C. before analyzing by GC-MS the amount of perfume having leaked out of the capsules during the month storage.

The results of the GC-MS analysis are the summarized in Table 5, wherein the percentages are defined by weight relative to the total weight of the ingredient present in the product base.

TABLE 5

Percentage of ingredient having leaked out of the capsules during one month storage

| Ingredients | % In fabric softener 37° C. | % In concentrated Liquid Detergent 22° C. | % In concentrated Liquid Detergent 37° C. |
|---|---|---|---|
| 1,8-Cineole | 11 | 2 | 21 |
| Verdylate | 5 | 1 | 14 |
| δ-Damascone | 3 | 1 | 8 |
| Lilial ® | 3 | 1 | 14 |
| Dihydroterpenyl acetate | 4 | 1 | 14 |
| β-Ionone | 5 | 1 | 14 |
| Lorysia ® | 5 | 1 | 11 |
| Iso E super ® | 4 | 1 | 4 |
| Cetalox ® | 3 | 0 | 4 |
| Habanolide ® | 1 | 0 | 0 |
| 1-Methyl-4-(4-methyl-3-pentenyl)-3-cyclohexene-1-carbaldehyde | 1 | 2 | 20 |
| Polysantol ® | 2 | 1 | 6 |
| Patchouli essential oil | 4 | 0 | 5 |
| Octalynol | 3 | N/D* | N/D* |
| Cyclohexyl salicylate | 7 | 1 | 25 |
| Isopropyl myristate | N/D* | N/D* | N/D* |
| Neobutenone ® alpha | 9 | 1 | 27 |
| Iralia ® total | 3 | 1 | 6 |
| Nectalactone | 5 | 1 | 19 |

*No data (not resolved)

These analytical results clearly show that perfume leakage of a given ingredient out of the capsule diminishes with increasing logP. Moreover, for similar logP, raw materials included in high steric hindrance Groups 1 to 7 clearly show a reduced leakage rate versus raw materials of similar logP not included in these groups.

Example 7

Olfactive Performance of the Microcapsules on Dry Fabrics, when Delivered from a Consumer Product of the Softener Type A perfuming composition as prepared in Example 6 was encapsulated following the process described in Example 2. Capsules were mixed at 1.25% into the unperfumed fabric-softener base described in Example 6. The final concentration of perfume in the softener base was 0.5%. A reference was prepared by mixing at 0.5% the free perfuming composition described in Example 6 with the unperfumed softener base described in the same example.

Fabrics (2.5 kg of cotton terry towels) were washed in a standard European horizontal axis machine (conditions: 40° C., short cycle, 85 g of unperfumed market detergent Via (origin: Unilever, Sweden)). There were added 35 g of freshly prepared fabric softener (with or without capsules) to the last rinse of the wash. Fabrics were then line-dried. The odor intensity of the cotton towels was evaluated after 1, 3 and 7 days, both before and after rubbing, by a panel of 15-20 people. On a blind test evaluation, the panel was asked to rate the odor intensity of the towels treated with the fabric softener comprising the capsules, respectively the fabric softener comprising the free perfume, on a scale 0 to 7, 0 corresponding to odorless and 7 to a very strong odor. The results of this blind test are presented in Table 6.

TABLE 6

Odor intensity of the cotton towels rinsed with freshly prepared fabric softener

| Sample | 1 day dry | | 3 days dry | | 7 days dry | |
|---|---|---|---|---|---|---|
| | Before rubbing | After rubbing | Before rubbing | After rubbing | Before rubbing | After rubbing |
| Free perfume | 2.5 | 2.7 | 3.2 | 3.3 | 3.6 | 3.8 |
| Encapsulated perfume | 4.6 | 6.4 | 4.6 | 5.8 | 4.2 | 5.5 |

The olfactive performance is clearly increased for dry fabrics treated with the encapsulated perfuming composition when compared to those treated with the free perfuming composition. The olfactive performance of the towels treated with the softener comprising the encapsulated perfume is already good before rubbing, but the odor intensity is further increased after rubbing, thus showing that release of the perfume from the capsules is enhanced by rubbing the towels.

The sensory analysis was repeated as described above, but with a fabric softener which had been stored at 35° C. for one month prior to the wash, instead of a freshly prepared fabric softener. The results are presented in Table 7.

TABLE 7

Odor intensity of the cotton towels rinsed with a fabric softener after one month storage

| Sample | 1 day dry | | 3 days dry | | 7 days dry | |
|---|---|---|---|---|---|---|
| | Before rubbing | After rubbing | Before rubbing | After rubbing | Before rubbing | After rubbing |
| Free perfume | 3.8 | 4.1 | 3.9 | 3.8 | 3.4 | 3.3 |
| Encapsulated perfume | 5.4 | 6.6 | 4.4 | 6.2 | 4.5 | 6.0 |

The olfactive performance is again clearly increased for dry fabrics treated with the encapsulated perfuming composition when compared to those treated with the free perfuming composition. A clear benefit is therefore still observed on fabrics treated with the softener containing the capsules of the invention (both before and after rubbing) even if the samples of softener (with and without capsules) have been stored for one month at 35° C. before washing.

Example 8

Olfactive Performance of the Microcapsules on Dry Fabrics, when Delivered from a Consumer Product of the Concentrated Liquid Detergent Type A perfuming composition as prepared in Example 6 was encapsulated following the process described in Example 2. Capsules were mixed at 0.75% into the commercially available unperfumed Tide® 2× HE Free of perfume & dye (trademark of Procter and Gamble, USA) concentrated liquid detergent. The final concentration of perfume in the detergent base is 0.3%. A reference is prepared by mixing at 0.3% the free perfuming composition described in Example 3 with the unperfumed Tide® 2× HE Free detergent base.

Fabrics (2.5 kg of cotton terry towels) were washed at 40° C. in a standard European horizontal axis machine. There were dispensed 50 g of freshly prepared detergent (with or without capsules) at the start of the wash through the detergent drawer. After the wash, fabrics were line-dried and the odor intensity of the cotton towels was evaluated after 1, 3 and 7 days, both before and after rubbing, by a panel of 15-20 people. On a blind test evaluation, the panel was asked to rate the odor intensity of the towels washed with the detergent comprising the capsules and with the detergent comprising the free perfume on a scale from 0 to 7, 0 corresponding to odorless and 7 corresponding to a very strong odor. The results of this blind evaluation are shown in Table 8.

TABLE 8

Odor intensity of the cotton towels washed with the fresh detergent

| Sample | 1 day dry | | 3 days dry | | 7 days dry | |
|---|---|---|---|---|---|---|
| | Before rubbing | After rubbing | Before rubbing | After rubbing | Before rubbing | After rubbing |
| Free perfume | 3.2 | 3.5 | 2.8 | 2.9 | 2.5 | 2.5 |
| Encapsulated perfume | 3.5 | 5.0 | 3.1 | 4.9 | 3.5 | 5.1 |

After 1, 3 and 7 days dry, the perfume impact on dry fabrics washed with the encapsulated perfuming composition was perceived stronger than on the dry fabrics washed with the free perfuming composition. As already pointed out in Example 4, the effect is even stronger after rubbing. Indeed, a very significant increase in perfume intensity is observed upon rubbing of fabrics treated with capsules, whereas rubbing has no impact for fabrics washed with the detergent comprising the free perfuming composition.

Example 9

Stability of the Microcapsules when Incorporated into a Consumer Product of the Softener Type or the Concentrated Liquid Detergent Type A perfuming composition was prepared by admixing the ingredients listed in Table 9, in the amounts indicated. The percentages being defined by weight relative to the total weight of the perfuming composition.

TABLE 9

Composition of the perfume

| Ingredients | % | LogP | Steric Hindrance Group |
|---|---|---|---|
| Cyclogalbanate[12] | 1.13 | 2.72 | 1 |
| Ethyl 2-methyl-pentanoate[13] | 1.62 | 2.76 | |
| 2,4-Dimethyl-3-cyclohexene-1-carbaldehyde[14] | 1.25 | 2.85 | 1 |
| Verdyl Acetate | 6.25 | 2.85 | 4 |
| γ-Undecalactone | 1.88 | 3.06 | |
| Yara yara[15] | 1.87 | 3.25 | |
| Verdyl propionate | 3.75 | 3.34 | 4 |
| Dihydroterpineol | 0.50 | 3.42 | 1 |
| Rose oxide | 0.25 | 3.58 | 1 |
| Allyl heptanoate | 0.63 | 3.67 | |
| Isobornyl acetate | 2.50 | 3.86 | 5 |
| δ-Damascone | 1.00 | 4.13 | 3 |
| Terpenyl acetate | 7.50 | 4.34 | 1 |
| Lilial ®[16] | 12.50 | 4.36 | 7 |
| Verdox ®[17] | 18.75 | 4.42 | 3 |
| Dihydroterpenyl acetate | 2.50 | 4.42 | 1 |
| β-Ionone | 12.50 | 4.42 | 3 |
| Geranyl acetate | 5.00 | 4.48 | |
| Iso E super ®[18] | 7.50 | 4.71 | 4 |
| Hexyl cinnamic aldehyde | 5.00 | 4.82 | |
| Habanolide ®[19] | 0.62 | 4.88 | 6 |
| Abalyn ® | 5.50 | >7 | |
| Total | 100.00 | | |

[12]Allyl (cyclohexyloxy)-acetate (origin: Dragoco, Holzminden, Germany)

TABLE 9-continued

Composition of the perfume

| Ingredients | % | LogP | Steric Hindrance Group |
|---|---|---|---|

[13])Origin: Firmenich SA, Geneva, Switzerland
[14])Origin: Firmenich SA, Geneva, Switzerland
[15])2-Methoxynaphthalene
[16])3-(4-Tert-butylphenyl)-2-methylpropanal (origin: Givaudan SA, Vernier, Switzerland)
[17])2-Tert-butyl-1-cyclohexyl acetate (origin: International Flavors and Fragrances, USA)
[18])1-(Octahydro-2,3,8,8-tetramethyl-2-naphtalenyl)-1-ethanone (origin: International Flavors and Fragrances, USA)
[19])Pentadecenolide (origin: Firmenich SA, Geneva, Switzerland)

The logP distribution of the ingredients present in the perfuming composition is summarized in Table 10 and the proportions of the perfuming composition consisting of ingredients from each of high steric hindrance Groups 1 to 7, as described above, is summarized in Table 11. The percentages are defined by weight, relative to the total weight of the perfuming composition.

TABLE 10

Composition of the perfume by logP of ingredients

| LogP | % |
|---|---|
| logP > 5 | 5.50 |
| 4.5 < logP < 5 | 13.12 |
| 4 < logP < 4.5 | 59.75 |
| 3.5 < logP < 4 | 3.38 |
| 3 < logP < 3.5 | 8.00 |
| 2.5 < logP < 3 | 10.25 |
| Total | 100.00 |

TABLE 11

Composition of the perfume by high steric hindrance group

| High steric hindrance group | % |
|---|---|
| Group 1 | 13.13 |
| Group 2 | 0.00 |
| Group 3 | 32.25 |
| Group 4 | 17.50 |
| Group 5 | 2.50 |
| Group 6 | 0.62 |
| Group 7 | 12.50 |
| Total concentration of ingredients in Groups 1 to 7 | 78.5 |
| Total concentration of Groups 3, 4, 6 and 7 ingredients | 62.87 |

This perfuming composition was encapsulated following the process described in Example 2 and added to either a concentrated fabric-softener or a concentrated liquid detergent.

The concentrated liquid detergent base was the commercially available Tide® 2× Concentrated HE Free of perfume & dye (trademark of Procter and Gamble, USA).

The concentrated fabric softener base was prepared as in Example 6

Capsules were mixed at 1.25% into the unperfumed softener or liquid detergent and both bases were stored for one month in ovens at either 22° C. or 37° C. before analyzing by GC-MS the amount of perfume having leaked out of the capsule during the month storage.

The results of the GC-MS analysis are the summarized in Table 12. The percentages are defined by weight, relative to the total weight of the ingredient in the capsules suspension.

TABLE 12

Percentage of perfume having leaked out of the capsules upon one month storage

| Perfuming composition | % In fabric softener at 22° C. | % In fabric softener at 37° C. | % In Concentrated Liquid Detergent at 22° C. | % In Concentrated Liquid Detergent at 37° C. |
|---|---|---|---|---|
| Cyclogalbanate | 15 | 82 | 15 | N/D* |
| Ethyl 2-methyl-pentanoate | 48 | 99 | 48 | 99 |
| 2,4-Dimethyl-3-cyclohexene-1-carbaldehyde | 20 | 40 | 20 | 70 |
| Verdyl acetate | 6 | 10 | 6 | 80 |
| γ-Undecalactone | 26 | 100 | 26 | 90 |
| Yara yara | 61 | 100 | 61 | 100 |
| Verdyl propionate | 5 | 8 | 5 | 51 |
| Dihydroterpineol | 13 | 85 | 13 | N/D* |
| Rose oxide | 8 | 68 | 8 | 92 |
| Allyl heptanoate | 46 | 98 | 46 | 100 |
| Isobornyl acetate | 4 | 12 | 4 | 21 |
| δ-Damascone | 3 | 10 | 3 | 16 |
| Terpenyl acetate | 3 | 17 | 3 | 37 |
| Lilial ® | 0 | 7 | 0 | 18 |
| Verdox ® | 3 | 8 | 3 | 17 |
| Dihydroterpenyl acetate | 2 | 0 | 2 | 16 |
| β-Ionone | 3 | 13 | 3 | 27 |
| Geranyl acetate | 10 | 53 | 10 | 77 |
| Iso E super ® | 2 | 4 | 2 | 9 |
| Hexyl cinnamic aldehyde | 2 | 18 | 2 | 46 |
| Habanolide ® | 0 | 0 | 0 | 0 |
| Abalyn ® | 0 | 0 | 0 | 0 |

*No data (not resolved)

As already observed with the perfuming composition prepared in Example 3, these analytical results clearly show that perfume leakage of a given ingredient out of the capsule diminishes with increasing logP. Moreover, for similar logP, raw materials included in high steric hindrance Groups 1 to 7 clearly show a reduced leakage rate versus raw materials of similar log P not included in these groups.

Example 10

Olfactive Performance of the Microcapsules on Dry Fabrics, when Delivered from a Consumer Product of the Softener Type A perfuming composition as prepared in Example 9 was encapsulated following the process described in Example 2. Capsules were mixed at 1.25% into the unperfumed softener fabric-softener base described in Example 6. The final concentration of perfume in the softener base was 0.5%. A reference was prepared by mixing at 0.5% the free perfuming composition described in Example 9 with the unperfumed softener base.

Fabrics (2.5 kg of cotton terry towels) were washed in a standard European horizontal axis machine (conditions: 40° C., short cycle, 85 g of unperfumed market detergent Via (origin: Unilever, Sweden)). There were added 35 g of freshly prepared fabric softener (with or without capsules) to the last rinse of the wash. Fabrics were then line-dried. The odor intensity of the cotton towels was evaluated after 1 day, both before and after rubbing, by a panel of 15-20 people. On a blind test evaluation, the panel was asked to rate the odor intensity of the towels treated with the fabric softener comprising the capsules, respectively with the fabric softener comprising the free perfume, on a scale from 0 to 7, 0 corresponding to odorless and 7 corresponding to a very strong odor.

The sensory analysis was repeated as described above, but with a fabric softener which had been stored at 35° C. for one month prior to the wash, instead of a freshly prepared fabric softener.

The results of these blind evaluations are summarized in Table 13 below.

TABLE 13

Odor intensity of the cotton towels

| Sample | Fresh samples 1 day dry | | After 1 month 1 day dry | |
|---|---|---|---|---|
| | Before rubbing | After rubbing | Before rubbing | After rubbing |
| Free perfume | 2.0 | 2.2 | 1.8 | 2.0 |
| Encapsulated perfume | 3.5 | 6.8 | 2.0 | 5.1 |

The olfactive performance is clearly increased for dry fabrics treated with the softener comprising the encapsulated perfuming composition when compared to those treated with the softener comprising the free perfuming composition. The olfactive performance of the towels treated with the softener comprising the encapsulated perfume is already good before rubbing, but the odor intensity is further increased after rubbing, thus showing that release of the perfume from the capsules is enhanced by rubbing the towels. A clear benefit can still be observed with a fabric softener stored for one month, mostly after rubbing of the fabric.

Example 11

Olfactive Performance of the Microcapsules on Dry Fabrics, when Delivered from a Consumer Product of the Concentrated Liquid Detergent Type A perfuming composition as prepared in Example 9 was encapsulated following the process described in Example 2. Capsules were mixed at 0.75% into the commercially available unperfumed Tide® 2× HE Free of perfume & dye (trademark of Procter and Gamble, USA) concentrated liquid detergent. The final concentration of perfume in the detergent base was 0.3%. A reference was prepared by mixing at 0.3% the free perfuming composition described in Example 9 with the unperfumed Tide® 2× HE Free of perfume & dye detergent base.

Fabrics (2.5 kg of cotton terry towels) were washed at 40° C. in a standard European horizontal axis machine. There were dispensed 50 g of freshly prepared detergent (with or without capsules) at the start of the wash through the detergent drawer. After the wash, fabrics were line-dried and the odor intensity of the cotton towels was evaluated after 1, 3 and 7 days, both before and after rubbing, by a panel of 15-20 people. On a blind test evaluation, the panel was asked to rate the odor intensity of the towels washed with the detergent comprising the capsules, respectively with the detergent comprising the free perfume on a scale from 0 to 7, 0 corresponding to odorless and 7 corresponding to a very strong odor. The results are shown in Table 14.

TABLE 14

Odor intensity of the cotton towels washed with the fresh detergent

| Sample | 1 day dry | | 3 days dry | | 7 days dry | |
|---|---|---|---|---|---|---|
| | Before rubbing | After rubbing | Before rubbing | After rubbing | Before rubbing | After rubbing |
| Free perfume | 1.8 | 2.0 | 2.3 | 2.8 | 1.2 | 1.2 |
| Encapsulated perfume | 3.3 | 4.6 | 4.4 | 5.5 | 4.0 | 5.3 |

On dry fabrics, after 1, 3 and 7 days dry, the perfume impact on fabrics washed with the detergent comprising the encapsulated perfuming composition is perceived stronger than with the free perfuming composition. As already pointed out in the previous examples, the effect is even stronger after rubbing.

What is claimed is:

1. A process for the preparation of polyurea microcapsules which consists essentially of:
    dissolving at least one polyisocyanate having at least two isocyanate groups in a perfume to form a first mixture;
    adding to the first mixture a colloidal stabilizer in the form of an aqueous solution comprising: from 0.1% to 0.4% of a polyvinyl alcohol and from 0.6% to 1% of a cationic copolymer of vinylpyrrolidone and of a quaternized vinylimidazol, with the percentages being defined by weight relative to the total weight of the colloidal stabilizer to form a second mixture; and
    adding to the second mixture a reactant selected from the group consisting of water soluble guanidine salts and guanidine and reacting the reactant with the second mixture under conditions sufficient to form microcapsules having a polyurea wall with the polyisocyanate.

2. The process according to claim 1, wherein the cationic copolymer of vinylpyrrolidone and of a quaternized vinylimidazol is a copolymer of vinylpyrrolidone and quaternized vinylimidazol in an aqueous solution.

3. The process according to claim 1, wherein the polyisocyanate comprises at least three isocyanate functional groups.

4. The process according to claim 1, wherein the polyisocyanate is a trimer of hexamethylene diisocyanate, a trimer of isophorone diisocyanate, or a biuret of hexamethylene diisocyanate.

5. The process according to claim 1, wherein the reactant is guanidine carbonate.

6. The process according to claim 1, wherein the perfume has a concentration of 28 to 60% by weight relative to the total weight of the microcapsules.

7. The process according to claim 1, wherein the perfume contains less than 5% of its own weight of primary alcohols, less than 10% of its own weight of secondary alcohols and less than 15% of its own weight of tertiary alcohols.

8. The process according to claim 1, wherein at least 50% of the perfume consists of perfuming ingredients selected from one or more of the following groups:
    Group 1: perfuming ingredients comprising a cyclohexyl, cyclohexenyl, cyclohexanone or cyclohexenone ring substituted with at least one linear or branched $C_1$ to $C_4$ alkyl or alkenyl substituent;
    Group 2: perfuming ingredients comprising a cyclopentyl, cyclopentenyl, cyclopentanone or cyclopentenone ring substituted with at least one linear or branched $C_4$ to $C_8$ alkyl or alkenyl substituent;
    Group 3: perfuming ingredients comprising a phenyl ring or perfuming ingredients comprising a cyclohexyl, cyclohexenyl, cyclohexanone or cyclohexenone ring substituted with at least one linear or branched $C_5$ to $C_8$ alkyl or alkenyl substituent or with at least one phenyl substituent and optionally one or more linear or branched $C_1$ to $C_3$ alkyl or alkenyl substituents;

Group 4: perfuming ingredients comprising at least two fused or linked $C_5$ and/or $C_6$ rings;

Group 5: perfuming ingredients selected from the group consisting of camphor, borneol, isobornyl acetate, 8-isopropyl-6-methyl-bicyclo[2.2.2]oct-5-ene-2-carbaldehyde, camphopinene, cedramber (8-methoxy-2,6,6,8-tetramethyl-tricyclo[5.3.1.0(1,5)]undecane), cedrene, cedrenol, cedrol, mixture of 9-ethylidene-3-oxatricyclo[6.2.1.0(2,7)]undecan-4-one and 10-ethylidene-3-oxatricyclo[6.2.1.0(2,7)]undecan-4-one, and 3-methoxy-7,7-dimethyl-10-methylene-bicyclo[4.3.1]decane;

Group 6: perfuming ingredients comprising at least one $C_7$ to $C_{20}$ ring structure; and Group 7: perfuming ingredients having a logP value above 3.5 and comprising at least one tert-butyl or at least one trichloromethyl substituent;

wherein the percentages are defined by weight, relative to the total weight of the perfume.

9. The process according to claim 8, wherein at least 50% of the perfume consists of perfuming ingredients selected from any one or more of Groups 3 to 7.

10. The process according to claim 9, wherein at least 50% of the perfume consists of perfuming ingredients selected from any one or more of Groups 3, 4, 6 or 7.

11. The process according to claim 1, wherein the perfume comprises at least 50% of perfuming ingredients having a logP above 3, wherein the percentages being defined by weight relative to the total weight of the perfume.

* * * * *